United States Patent [19]

Boyer

[11] 4,104,250
[45] Aug. 1, 1978

[54] FLAME-RETARDANT POLYMERS WITH 1,3,5-TRIAZINES HAVING HALO- AND HALO-ARYL SUBSTITUTENTS

[75] Inventor: Nicodemus E. Boyer, Redwood City, Calif.

[73] Assignee: Borg-Warner Corporation, Chicago, Ill.

[21] Appl. No.: 713,466

[22] Filed: Aug. 11, 1976

[51] Int. Cl.$^2$ .......................... C08K 5/34; C08K 5/36; C07D 251/52
[52] U.S. Cl. .............................. 260/45.8 NT; 544/194; 544/218
[58] Field of Search ................... 260/45.8 NT, 248 R, 260/248 CS

[56] References Cited

U.S. PATENT DOCUMENTS

| | | | |
|---|---|---|---|
| 3,198,797 | 8/1965 | Dexter et al. | 260/45.8 NT |
| 3,291,796 | 12/1966 | Ross et al. | 260/249.5 |
| 3,682,908 | 8/1972 | Ismail | 260/248 CS |
| 3,687,952 | 8/1972 | Ismail | 260/248 CS |
| 3,843,650 | 10/1974 | Pews et al. | 260/45.8 NT |

FOREIGN PATENT DOCUMENTS

| | | | |
|---|---|---|---|
| 436,285 | 11/67 | Switzerland | 260/248 CS |
| 872,313 | 7/1961 | United Kingdom | 260/248 |
| 977,587 | 12/1964 | United Kingdom | 260/248 CS |

OTHER PUBLICATIONS

DOS 2,246,106, Bayer A/G Mar. 28, 1974. 44 pp.

*Primary Examiner*—H.S. Cockeram
*Attorney, Agent, or Firm*—Joseph Shekleton

[57] ABSTRACT

Flame-retardant polymer compositions containing mono or bis(haloarylamino)triazines or mono or bis(haloarylthio)triazines. These triazines impart a high degree of flame retardance to all types of normally flammable polymers but especially to ABS polymers.

8 Claims, No Drawings

FLAME-RETARDANT POLYMERS WITH 1,3,5-TRIAZINES HAVING HALO- AND HALO-ARYL SUBSTITUTENTS

This invention relates as indicated to flame-retardant compositions. More particularly it relates to polymer compositions which have an increased degree of flame retardance because of the presence of certain haloaryl substituted triazines.

Polymers vary widely in their resistance to burning. Some, such as the polyolefins, polystyrene, polyalkyl acrylates and methacrylates, and the like, burn readily. Polytetrafluoroethylene, polyvinylidene chloride and polyvinyl chloride, on the other hand, have a rather high resistance to burning. It is highly desirable that, for certain applications, a polymer should have a high degree of flame retardance so that it will meet various building codes, or that it will meet safety standards imposed on the manufacture of toys, automotive applications, etc.

The treatment of those more flammable polymers to increase their resistance to burning is well known; such treatment in general has involved the incorporation in the polymer composition of substantial proportions of antimony trioxide, halogenated paraffins, halogenated hydrocarbons and low molecular weight phosphate esters. Ordinarily, though, the effective use of these and other additives has required their presence in such high concentrations as to adversely affect the desirable properties of the polymer. Thus, such desirable properties as hardness, clarity, strength, elasticity, etc., are diminished significantly by the presence of large amounts of a flame-retarding chemical.

The formulator's goal, in preparing a flame-retardant polymer composition, is to add just enough of the flame-retardant compound so as to provide the desired degree of flame retardance, but no more than this minimum amount, so as to preserve as much as possible the advantageous properties of the polymer. Frequently, it is not possible to select a flame retardant which will meet these requirements.

Presently used flame-retardant compositions generally include, in addition to the organic flame-retardant compound, a significant proportion, i.e., 1-15%, of an inorganic compound such as antimony trioxide ($Sb_4O_6$), antimony chloride, borax, etc. These inorganic compounds by themselves are relatively ineffective as flame retardants, but act synergistically with the organic flame-retardant compound to give much better results than can be achieved by use of the organic compound alone. By far the most widely used of these inorganic compounds is antimony trioxide; unfortunately, it is relatively expensive, so that its use in large quantities is undesirable. Against this cost factor must be balanced its superior effectiveness as a synergist.

This invention is a polymer composition comprising a normally flammable polymer and a substituted triazine having the structural formula

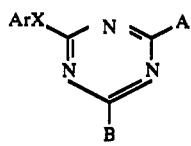

where Ar is haloaryl, X is S or NH, A is halogen, and B is ArX or halogen. The halogen contained in such substituted triazines is apparently more efficiently utilized as a flame-retarding agent than the halogen in previously known flame retardants. Also, smaller amounts of inorganic synergist are required.

The halogen of the haloaryl radical preferably is bromine or chlorine. While iodine and fluorine are also contemplated the substituted triazines containing these halogens are not as effective as those which contain bromine or chlorine. Particularly preferred are those substituted triazines wherein each aryl group contains two or more bromine or chlorine atoms. Tribromophenyl-substituted triazines and trichlorophenyl-substituted triazines are specific illustrations of particularly preferred species.

The halogen which is A and/or B may be chlorine, bromine, fluorine or iodine. In most cases, however, it is chlorine because of the ready availability of cyanuric chloride from which the substituted triazines of this invention are prepared, and also because such chlorine-substituted triazines are especially effective and are so conveniently prepared.

The bridging group between the triazine nucleus and each haloaryl radical is either sulfur (S) or imino (NH). Those triazine compounds wherein the bridging group is sulfur are previously unreported in the prior art, i.e., they are new compounds.

The relative proportions of the flame-retardant triazines which are to be used in the polymer compositions are, as indicated, the result of a careful balancing of that minimum amount which will provide the desired degree of flame retardance and the maximum amount which will not have too adverse an effect upon the polymer's good properties. In general, it should be present in such concentration as to provide from about 5% to about 20% of halogen in the polymer composition. Most usually, the flame-retardant triazine will be present in such concentration as to provide from about 7% to about 16% of halogen.

As indicated earlier herein, an inorganic synergist usually is used in combination with the triazine. These inorganic synergists include primarily antimony trioxide ($Sb_4O_6$) and sodium borate ($Na_3BO_3$); others include antimony pentoxide ($Sb_2O_5$), antimony chloride ($SbCl_3$), antimony oxychloride ($SbOCl_3$), antimony bromide ($SbBr_3$), arsenic trioxide ($As_2O_3$), arsenic pentoxide ($As_2O_5$), zinc borate ($Zn_3B_4O_9$), stannous oxide hydrate ($SnO.H_2O$), and borax ($Na_2B_4O_7$).

The inorganic synergists, according to one theory, are effective because they react with the halogen-containing flame-retardant triazine to form a volatile metal halide, e.g., $SbBr_3$, which reacts with free radicals produced in the oxidation (burning) reaction and thereby snuffs out the flame.

Although the use of larger amounts of the flame-retardant triazine precludes the necessary use of inorganic synergists, it is preferred in most instances to use a somewhat lesser amount of flame-retardant triazine in combination with an inorganic synergist. The amount of such synergist thus used will range up to about 15% of the polymer compositions. Preferably it will be up to about 10%.

For optimum results the relative proportions of triazine and antimony oxide (as the synergist) should be such that the ratio of halogen (in the triazine) to antimony is about 3:1 on a molar basis.

The triazines of the invention may be prepared from cyanuric chloride.

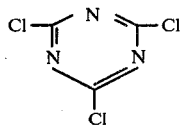

The chlorine atoms above are reactive with the hydrogen of an NH$_2$ or SH group in a substituted aniline or thiophenol, to give a substituted triazine. It will be noted that reaction to produce the unsymmetrical triazines of this invention requires one or two mols of a substituted aniline or thiophenol for each mol of cyanuric chloride. In most instances the reaction proceeds merely by heating the two reactants, preferably in a solvent such as o-dichlorobenzene, tetrahydrofuran, etc., and in the presence of an alkaline material, e.g., sodium methylate, sodium carbonate, sodium hydroxide, trimethylamine, triethylamine, etc., although the alkaline material is not essential.

In other instances, particularly with the preparation of bis(haloarylamino-)triazines, i.e., where B in the above structural formula (of the substituted triazine of the invention) is ArX, it sometimes is advisable to utilize a two-step procedure, forming first the mono-substituted triazine by means of the above reaction conditions, and then forming the desired di-substituted triazine by treatment under more stringent conditions, viz., heating the intermediate product with a stoichiometric excess of the halo-substituted aromatic amine reactant. Sometimes, however, the desired di-substituted triazine can be prepared in but one step merely by heating the two reactants at a relatively high temperature, e.g., 100°–200° C, with or without a solvent and without an alkaline material.

In yet another method, the mono- or diarylamino-, or mono- or diarylthio-substituted 1,3,5-triazines may be halogenated to yield the corresponding haloaryl compounds. N,N',N"-triphenylmelamine, for example, can be chlorinated to produce N, N'-bis(chlorophenyl)-N"-phenyl-melamine.

The preparation of illustrative substituted triazines is shown in the following examples.

EXAMPLE 1

A mixture of 164.9 g. (0.5 mol) of 2,4,6-tribromoaniline, 90.7 g. (0.5 mol) of cyanuric chloride, 53.0 g. (0.5 mol) of sodium carbonate and 1.4 l. of xylene is prepared with agitation and then heated at 135° C for 16.75 hours. The hot product mixture is filtered and the solid washed with 700 ml. of tetrahydrofuran which is added to the filtrate. The pale yellow filtrate is treated with charcoal, then concentrated in a flash evaporator and filtered. The resulting off-white solid weighs 157.0 g. (65.7% of the theory), M.P., 265°–266° C. Its identity as 2,4-dichloro-6-(2',4',6'-tribromophenylamino)1,3,5-triazine is established by elemental analyses (C, H, N, Br and Cl) and its infrared spectrum.

EXAMPLE 2

A mixture of 92.2 g. (0.5 mol) of cyanuric chloride, 98.2 g. (0.5 mol) of 2,4,6-trichloroaniline, 53.0 g. (0.5 mol) of sodium carbonate and 1.4 l. of xylene is prepared and heated at reflux temperature for 17 hours, then filtered while hot. The filtrate is treated with charcoal, concentrated to a small volume which then is diluted with an equal volume of n-heptane and filtered. The white crystalline solid weighs 120.8 g. (70.2% of the theory), M.P., 202°–205° C. Its identity as the desired 2,4-dichloro-6-(2',4',6'-trichlorophenylamino-) 1,3,5-triazine is established by elemental analyses, infrared spectrum and NMR spectrum.

EXAMPLE 3

A mixture of 27.7 g. (0.15 mol) of cyanuric chloride, 15.9 g. (0.15 mol) of sodium carbonate and 0.7 l. of xylene is prepared and cooled to −15° C. To this cold, stirred mixture, in a nitrogen atmosphere, there is added portionwise over a period of one hour a solution of 48.0 g. (0.15 mol) of 2,4-dibromo-3,6-dichloroaniline in 500 ml. of xylene. The resulting mixture is permitted to warm up to room temperature during the next hour and then heated at reflux temperature for 17 hours. The product mixture is filtered and the filtrate treated with charcoal and concentrated to a small volume, then diluted with an equal volume of n-heptane and filtered. The solid is crystallized from a mixture of tetrahydrofuran and n-heptane; infrared and NMR spectra indicated the presence of 2,4-dichloro-6-(2',4'-dibromo-3',6'-dichlorophenylamino-)1,3,5-triazine.

EXAMPLE 4

A mixture of 47.8 g. (0.1 mol) of 2,4-dichloro-6-(2',4',6'-tribromophenylamino-)1,3,5-triazine, 131.9 g. (0.4 mol) of 2,4,6-tribromoaniline and 1.6 l. of o-dichlorobenzene is heated in a nitrogen atmosphere at reflux temperature for 20.5 hours. The product mixture is treated with charcoal, then concentrated and diluted with n-heptane. Filtration yields an off-white, crystalline solid which is washed with hot n-heptane, dissolved in 400 ml. of tetrahydrofuran, treated with charcoal, diluted with n-heptane and concentrated to a small volume. Filtration yields a solid which is crystallized from mixed tetrahydrofuran and n-heptane, then from mixed xylene and n-heptane to yield 25.3 g. (32.3% of the theory) of an off-white solid, M.P., 218°–225° C. It is shown by elemental analysis to be 2-chloro-4,6-bis-(2',4',6'-tribromophenylamino-) 1,3,5-triazine, although somewhat impure.

EXAMPLE 5

To a solution of 106.8 g. (0.5 mol) of 2,4,5-trichlorothiophenol in 500 ml. of methanol, there is added 108 g. of a 25% solution of sodium methylate (0.5 mol) in methanol and the resulting mixture is heated at reflux temperature for 30 minutes, then concentrated, at reduced pressure, to dryness. The beige residue is dissolved in 900 ml. of tetrahydrofuran and added dropwise over a period of 2.3 hours, with stirring at a temperature of −15° C to −5° C, to a solution of 92.2 g. (0.5 mol) of cyanuric chloride in 800 ml. of tetrahydrofuran. The temperature of the mixture is permitted to rise to room temperature during the next hour and maintained there for another hour. Filtration through a siliceous filter aid yields a clear, yellow filtrate which is treated with charcoal, then diluted with an equal volume of n-heptane and concentrated to a small volume. Filtration of this residue yields an off-white crystalline solid which is recrystallized from a mixture of tetrahydrofuran and n-heptane, then from a mixture of toluene and n-heptane, to yield 35.2 g. (26.1% of the theory) of 2-chloro-4,6-bis-(2',4',5'-trichlorophenylthio-)1,3,5-triazine, M.P., 174.5°–177° C, identified by elemental analysis.

EXAMPLE 6

A mixture of 113 g. (0.4 mol) of pentachlorothiophenol and 86.4 g. (0.4 mol) of a 25% solution of sodium methylate in methanol is heated at reflux temperature for 30 minutes, then concentrated to dryness under reduced pressure. A solution of the residue in 1.2 l. of tetrahydrofuran and 1 l. of acetone is added dropwise over a period of 2 hours to a stirred solution of 73.8 g. (0.4 mol) of cyanuric chloride in 500 ml. of tetrahydrofuran. The temperature is maintained at −15° C to −5° C throughout and then allowed to rise to 35° C during the next hour and kept there for another hour. The product mixture is filtered and the filtrate treated with charcoal, mixed with an equal volume of n-heptane, concentrated to a small volume, and filtered. The solid weighs 118.2 g. (68.7% of the theory) and is identified by elemental analyses as the desired 2,4-dichloro-6-(pentachlorophenylthio)1,3,5-triazine.

EXAMPLE 7

To a stirred solution of 21.3 g. (0.115 mol) of cyanuric chloride in 500 ml. of tetrahydrofuran, in a nitrogen atmosphere, there is added dropwise throughout a period of two hours a solution of 42.6 g. (0.115 mol) of the sodium salt of 2,4,6-tribromothiophenol in 1800 ml. of tetrahydrofuran. The temperature is maintained at −10° C to −5° C throughout this period and then permitted to rise to 22° C for the next 2 hours. The mixture is filtered and the filtrate is treated with charcoal, then diluted with an equal volume of n-heptane and concentrated to a small volume. Filtration yields a beige solid which is dissolved in 500 ml. of hot toluene, treated with charcoal, and concentrated to a small volume. An equal volume of n-heptane is added and the resulting mixture is cooled and filtered, yielding a biege crystalline solid. This solid is recrystallized from a mixture of benzene and n-heptane to yield 16.9 g. of a beige crystalline solid, M.P., 143°–148° C. Its identity as the desired 2,4-dichloro-6-(2',4',6'-tribromophenylthio-)1,3,5-triazine is established by elemental analyses.

EXAMPLE 8

To a stirred, cooled (−10° C to 0° C) solution of 10.65 g. (0.0577 mol) of cyanuric chloride in 500 ml. of tetrahydrofuran, in a nitrogen atmosphere, there is added dropwise over a period of 2.5 hours a solution of 42.6 g. (0.115 mol) of the sodium salt of 2,4,6-tribromothiophenol in 1800 ml. of tetrahydrofuran. Stirring is continued for an additional 4 hours during which time the temperature is permitted to rise to 25° C. The product mixture is filtered. The filtrate is treated with charcoal, diluted with an equal volume of n-heptane and concentrated to a small volume, then cooled and filtered. The solid is dissolved in 500 ml. of toluene, treated with charcoal, concentrated on a flash evaporator and diluted with 300 ml. of n-heptane. The cooled mixture is filtered and the resulting beige, crystalline solid is recrystallized from a mixture of benzene and n-heptane to yield 16.2 g. (34.8% of the theory) of the desired 2-chloro-4,6-bis(2',4',6'-tribromophenylthio-)1,3,5-triazine, M.P., 228°–237° C, identified by elemental analyses.

EXAMPLE 9

A mixture of 412.3 g. (1.25 mol) of 2,4,6-tribromoaniline, 226.8 g. (1.25 mol) of cyanuric chloride, 132.5 g. (1.25 mol) of sodium carbonate and 3.5 l. of xylene is prepared and heated under nitrogen at reflux temperature (130° C) for 22.7 hours, then filtered and the solid washed with 1.2 l. of hot tetrahydrofuran and this tetrahydrofuran wash added to the filtrate. The combined filtrates are treated with charcoal then concentrated to a very small volume. This residue is taken up in hot heptane and filtered yielding 364.6 g. (61.1% of theory) of a white, crystalline solid, M.P., 263°–265° C. It is shown by liquid chromatography and elemental analyses to be the desired 2-(2',4',6'-tribromophenylamino-)4,6-dichloro-1,3,5-triazine.

The flame retardance of a plastic material can be determined by means of Underwriters Laboratories Test UL-94. The test specimen measures 5 × 0.5 × 0.062; it is suspended vertically at a measured height above the flame from a Bunsen burner. After 10 seconds the flame is removed and the duration of the flaming of the test specimen is noted. Immediately, the flame is placed again under the specimen and after 10 seconds the flame again is withdrawn and the duration of flaming and glowing is noted. Five test specimens are thus tested and the results of all five tests are considered in the determination of a rating for the plastic material.

The following are noted: (1) duration of flaming after first flame application; (2) duration of flaming after second flame application; (3) duration of flaming plus glowing after second flame application; (4) whether or not specimens burn up to their point of suspension; and (5) whether or not specimens drip flaming particles which ignite a cotton swatch placed 12 inches beneath the test specimen. The highest rating given to a material is "V-O". It indicates that (1) no specimen burns with flaming combustion for more than 10 seconds after each application of the test flame; (2) the material does not have a flaming combustion time exceeding 50 seconds for the 10 flame applications for each set of five specimens; (3) no specimen burns with flaming or glowing combustion up to the holding clamp; (4) no specimen drips flaming particles that ignite the dry cotton beneath the specimen; and (5) no specimen glows for more than 30 seconds after the second removal of the flame.

The next highest rating is "V-1". It indicates that (1) no specimen burns with flaming combustion for more than 30 seconds after each application of the test flame; (2) the material does not have a flaming combustion time exceeding 250 seconds for the 10 flame applications for each set of five specimens; (3) no specimen burns with flaming or glowing combustion up to the holding clamp; (4) no specimen drips flaming particles that ignite the dry cotton beneath the specimen; and (5) no specimen glows for more than 60 seconds after the second removal of the flame.

The lowest rating given to a material in this test is "NSE" ("non-self-extinguishing"). It indicates that the material has failed to meet one or more of the criteria for the UL-94 vertical test.

Another test for the flammability of a plastic material measures the minimum concentration of oxygen that will just support combustion. The test is an ASTM test, D 2863-70. It is carried out in a glass column wherein the concentration of oxygen is varied until that concentration is found which will just support the burning of a test specimen, for 3 minutes or until 50 mm of the specimen has burned. The test specimen is 70–150 mm long by 6.5 mm wide by 3.0 mm thick. This concentration of oxygen is called the oxygen index. A high oxygen index indicates a highly flame-retardant specimen.

The formulation of flame-retardant polymeric compositions based on the substituted triazines herein is shown in Table I.

TABLE I

|  | Ex. 1 | Ex. 2 | Ex. 4 | Ex. 7 | Ex. 8 |
|---|---|---|---|---|---|
| ABS[a] | 100.0 | 100.0 | 100.0 | 100.0 | 100.0 |
| CPE[b] | 5.0 | 5.0 | 5.0 | 5.0 | 5.0 |
| $Sb_4O_6$ | 6.5 | 8.6 | 7.9 | 11.2 | 11.2 |
|  | (4.0% Sb) | (5.0% Sb) | (4.6% Sb) | (7.0% Sb) | (7.0% Sb) |
| Mg Stearate | 0.75 | 0.75 | 0.75 | 0.75 | 0.75 |
| Dibutyl Tin Dimaleate | 1.25 | 1.25 | 1.25 | 1.25 | 1.25 |
| Polyethylene Glycol | 0.5 | 0.5 | 0.5 | 0.5 | 0.5 |
| Sample of Flame Retardant | 21.6 | 28.2 | 28.7 | 14.8 | 14.6 |
|  | (8.0% Br) | (10.0% Cl) | (11.3% Br) | (5.4% Br) | (6.5% Br) |
|  | (2.4% Cl) |  | (1.0% Cl) | (1.6% Cl) | (0.5% Cl) |

[a]A graft polymer of 51.5% of styrene and 28.5% of acrylonitrile on 20% of polybutadiene.
[b]Chlorinated polyethylene containing 36% chlorine.

The "sample of flame retardant" in each case above (TABLE I) is a product obtained by the procedure of the indicated example.

The flame retardant properties of these compositions are shown by the data set out in TABLE II.

TABLE II

| Sample | Rating | MBT* | ABT* | O.I. |
|---|---|---|---|---|
| Ex. 1 | V-O | 1 sec. | 0.9 sec. | 31.0 |
| Ex. 2 | V-O | 1 sec. | 0.4 sec. | 30.0 |
| Ex. 4 | V-O | 1 sec. | 0.5 sec. | 33.5 |
| Ex. 7 | V-O | 3 sec. | 1.5 sec. | 28.0 |
| Ex. 8 | V-O | 5 sec. | 3.1 sec. | 27.0 |

*MBT = maximum burn time after removal of the ignition source; ABT = average burn time after removal of the ignition source; O.I. = oxygen index.

The effectiveness of 2,4-dichloro-6-(2',4',6'-tribromophenylamino-)1,3,5-triazine, prepared as in Example 1, in varying concentrations and in varying ratios of concentrations with respect to the concentration of antimony oxide, is shown in TABLE III which shows the various compositions and test data resulting from testing those compositions. In each case the composition is identical to that of "Ex. 1"of TABLE I except for the amounts of "Sample" and "$Sb_4O_6$".

TABLE III

| Amounts |  |  |  |  |  |
|---|---|---|---|---|---|
| Sample | $Sb_4O_6$ | Rating | MBT | ABT | O.I. |
| 15.2 | 4.6 | V-1 | 20 | 10.8 | 27.5 |
| 21.6 | 6.5 | V-O | 1 | 0.9 | 31.0 |
| 28.9 | 8.7 | V-O | 1 | 0.7 | 33.0 |
| 21.2 | 4.3 | V-O | 5 | 3.4 | 30.5 |
| 27.2 | 1.6 | V-O | 2 | 1.0 | 28.0 |

Comparative test data showing the relative effectiveness of the substituted triazines of this invention and that (oxygen analog) of the prior art are presented in TABLE IV. In each case the polymer composition contains the following components:

| Parts | Components |
|---|---|
| 100 | ABS |
| 5.0 | CPE |
| 0.75 | Mg Stearate |
| 1.25 | Dibutyl Tin Dimaleate |
| 0.5 | Polyethylene Glycol | plus, of course, the substituted triazine and antimony trioxide. The compositions of the triazines (shown in TABLE IV) conform to the formula

TABLE IV

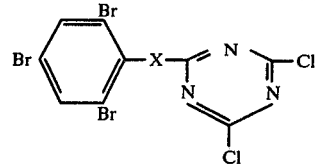

| No. | X | % Br | % Cl | % Sb | Rating | ABT | MBT | O.I. |
|---|---|---|---|---|---|---|---|---|
| I | O | 6.0 | 1.7 | 3.0 | NSE | — | — | 26.5 |
| II | O | 8.0 | 2.3 | 4.0 | NSE | — | — | 28.5 |
| III | O | 10.0 | 2.8 | 4.6 | V-O | 1.1 | 3 | 30.5 |
| IV | NH | 6.0 | 1.8 | 3.0 | V-1 | 10.8 | 20 | 27.5 |
| V | NH | 8.0 | 2.4 | 4.0 | V-O | 0.9 | 1 | 31.0 |
| VI | NH | 10.0 | 3.0 | 5.0 | V-O | 0.7 | 1 | 32.0 |
| VII | S | 5.4 | 1.6 | 7.0 | V-O | 1.5 | 3 | 28.0 |

It will be noted, in each comparison, that the imino-containing and sulfur-containing triazines are superior to the oxygen-containing analogs with respect to flame-retardant properties.

The effectiveness of the flame retardants herein in polypropylene is shown in TABLE V. The data there is based on comparative tests of 2-(2',4',6'-tribromophenylamino-) 4,6-dichloro-1,3,5-triazine (prepared as in Example 9, and having a bromine content of 50.2%) and Dechlorane Plus 25, a fire-retardant compound having the formula

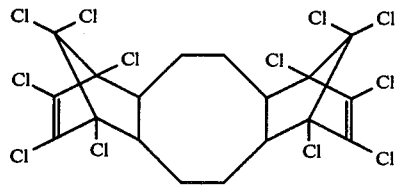

and a chlorine content of 65.1%. The tests compare the fire-retardant effectiveness of these two compounds at ratios of halogen/antimony of 2:1, 4:1 and 6:1. For purposes of calculating such ratios the chlorine of the triazine compound (of this invention), being attached directly to the triazine ring, is assumed to be substantially ineffective with respect to fire retardance and is not included within the halogen content.

TABLE V

| Halogen/Sb |  | Dechlorane Plus 25 | Product of Ex. 9 |
|---|---|---|---|
| 16.66/8.33 (2:1) | Polypropylene | 100.0 | 100.0 |
|  | $Sb_4O_6$ | 15.5 | 17.5 |
|  | Flame retardant | 39.8 | 58.4 |
|  | Flame Response Tests |  |  |
|  | UL-94 | NSE | V-O |
|  | ABT | — | 1.6 |
|  | MBT | — | 3.0 |
|  | O.I. | 26.5 | 26.0 |
| 20.0/5.0 (4:1) | Polypropylene | 100.0 | 100.0 |
|  | $Sb_4O_6$ | 9.5 | 11.0 |
|  | Flame retardant | 48.6 | 73.5 |
|  | Flame Response Tests |  |  |
|  | UL-94 | V-1 | V-O |
|  | ABT | 4.6 | 1.4 |
|  | MBT | 17 | 9 |
|  | O.I. | 27.0 | 26.5 |
| 21.44/3.56 (6:1) | Polypropylene | 100.0 | 100.0 |
|  | $Sb_4O_6$ | 6.8 | 8.0 |
|  | Flame retardant | 52.5 | 80.6 |
|  | Flame Response Tests |  |  |
|  | UL-94 | V-1 | V-O |
|  | ABT | 6.4 | 1.6 |
|  | MBT | 15 | 4 |

TABLE V-continued

| Halogen/Sb | Dechlorane Plus 25 | Product of Ex. 9 |
|---|---|---|
| O.I. | 27.5 | 25.5 |

It will be seen that the substituted triazine of the invention is effective, at several ratios of flame retardant to antimony oxide, to impart a high degree of flame retardance to polypropylene; in each of the above three tests a V-O rating is obtained. The prior art flame-retardant compound, on the other hand, is rated NSE (not self-extinguishing), V-1 and V-1. Furthermore, the ABT (average burning time) and MBT (maximum burning time) are less (which is better) for the substituted triazine than for the prior art flame-retardant compound.

All parts and percentages herein are by weight unless otherwise expressly stated.

I claim:

1. A flame-retardant polymeric composition comprising in combination a normally flammable polymer and a substituted triazine having the structural formula

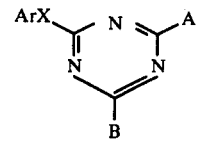

where Ar is haloaryl, X is sulfur or imino, A is halogen, and B is ArX or halogen.

2. The flame-retardant composition of claim 1 wherein the normally flammable polymer is polypropylene.

3. The flame-resistant composition of claim 1 wherein the normally flammable polymer is an ABS resin.

4. The flame-resistant composition of claim 1 wherein A is chlorine.

5. The flame-resistant composition of claim 1 wherein X is NH.

6. The flame-resistant composition of claim 1 wherein X is sulfur.

7. The flame-resistant composition of claim 1 wherein Ar is bromophenyl.

8. The flame-resistant composition of claim 1 wherein Ar is tribromophenyl.

* * * * *